United States Patent Office 3,502,722
Patented Mar. 24, 1970

3,502,722
CARBODIIMIDES
Wolfram Neumann, Leverkusen, Germany, assignor to Farbenfabriken Bayer Aktiengesellschaft, Leverkusen, Germany, a corporation of Germany
No Drawing. Continuation-in-part of application Ser. No. 110,651, May 17, 1961. This application Jan. 8, 1968, Ser. No. 696,129
Claims priority, application Germany, May 24, 1960, F 31,297
Int. Cl. C07c *119/04*
U.S. Cl. 260—566    9 Claims

ABSTRACT OF THE DISCLOSURE

Carbodiimides are prepared by heating aromatic isocyanates having in the ortho position to the NCO groups organic radicals containing from 2 to 18 carbon atoms in the presence of catalysts that promote trimerization of organic isocyanates which are unhindered. The carbodiimide of the formula

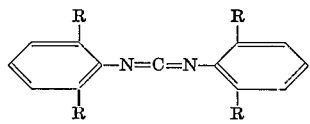

or

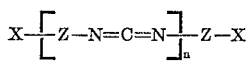

wherein Z is

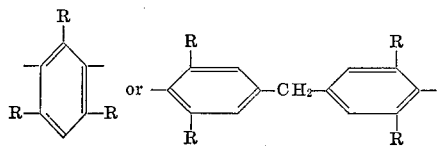

R is an alkyl radical or an alkoxy radical having 2 to 18, preferably 2 to 4 carbon atoms, X is —NCO or —N=C=N—R′ wherein R′ is the residue remaining after removal of an —NCO group from an organic monoisocyanate and $n$ is an integer of 2 to 40 are particularly useful for stabilizing polyesters against hydrolysis.

This application is a continuation-in-part of copending application Ser. No. 110,651, filed May 17, 1961 and now abandoned.

This invention relates to carbodiimides and, more particularly, to improved carbodiimides and catalysts for the preparation thereof.

Carbodiimides are described in the literature such as, for example, in Chemical Reviews 53, 145 (1953). Carbodiimides are usually prepared by treating disubstituted thioureas with metal oxides such as mercury oxide or they may be obtained from isocyanates in the presence of a phosphorous catalyst, for example, as described in U.S. Patents 2,853,473 and 2,853,518. Other catalysts such a tertiary amines and metal compounds have not proven effective for the production of carbodiimides because they cause trimerization of organic isocyanates with the production of isocyanuric acid rings. Moreover, carbodiimides which have a low vapor pressure and a high stability have not been available heretofore.

It is, therefore, an object of this invention to provide improved carbodiimides which have a low vapor pressure and a high stability. Another object of this invention is to provide a method of catalyzing the formation of carbodiimides. A further object of this invention is to provide an improved method of making carbodiimides based on polyisocyanates. Still another object of this invention is to provide improved stability against heat and moisture for polyester compositions.

The foregoing objects and others which will become apparent from the following description are accomplished in accordance with the invention, generally speaking, by providing carbodiimides prepared by heating to at least about 120° C. an organic isocyanate having all of its aliphatically bonded —NCO groups directly attached to carbon atoms containing no more than one hydrogen atom and all of its aromatically bonded —NCO groups attached to a carbon atom of a benzene ring which has ortho thereto at least one organic radical containing from 2 to 18 carbon atoms in the presence of a catalyst which will promote the trimerization of an organic isocyanate which has its —NCO groups bonded to carbon atoms with two hydrogen atoms or to a benzene ring carbon atom which has no substituents containing more than two carbon atoms ortho thereto. Therefore, this invention provides for the production of carbodiimides using catalysts which are customarily used to promote the trimerization of organic isocyanates but according to the process of this invention, isocyanates are used which have all of their isocyanato groups bonded to carbon atoms in a position where they will be sterically hindered as more particularly pointed out above so that instead of the customary isocyanuric acid rings, one obtains a carbodiimide linkage according to the equation:

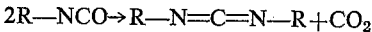

The sterically obstructed isocyanates suitable for the process can be prepared by the well-known phosgenation of the corresponding amines which can themselves be obtained by nitration of the corresponding hydrocarbons and reduction thereof, the alkylated aromatic amines are obtained by alkylation of the corresponding amines. (Angew. Chem. 69, 124 [1957].)

Any suitable organic isocyanate may be used in the process of this invention provided it has all —NCO groups bonded to secondary carbon atoms or carbons ortho to an organic radical on a benzene ring as set forth above. Examples of aliphatic and cycloaliphatic isocyanates, the isocyanato groups of which are bonded to carbon atoms, which carbon atoms still comprise at the most one hydrogen atom and which carry two or three alkyl substituents per carbon atom, are methyl isopropyl methyl isocyanate, diethyl methyl isocyanate, methyl-(b-phenylethyl)-methyl-isocyanate, cyclohexyl-methyl-methyl-isocyanate, and tertiary butyl isocyanate and the like. The aromatic isocyanates which carry one or two aryl, alkyl, aralkyl or alkoxy substituents in the ortho position to all isocyanato groups, at least one of the substituents comprising at least two carbon atoms, include monoisocyanates of the following structure:

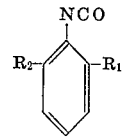

in which $R_1$ represents an alkyl, aralkyl or alkoxy radical of $C_2$ to $C_{18}$, $R_2$ represents hydrogen, but advantageously substituents such as alkyl, aralkyl, alkoxy, nitro, halogen, carboethoxy and the like. The following are examples:

o-phenyl-phenyl-isocyanate,
2-ethyl-phenyl-isocyanate,
2-isopropyl-phenyl-isocyanate,
2-di-sec. butyl-phenyl-isocyanate,
2-tertiary-butyl-phenyl-isocyanate,
2,4-diisopropyl-phenyl-isocyanate,
2,4-di-sec. butyl-phenyl-isocyanate, 2-ethoxy-phenyl-isocyanate,
2-isopropoxy-phenyl-isocyanate,
2-isobutoxy-phenyl- isocyanate,
2,6-diethyl-phenyl-isocyanate,
2,6-diisopropyl-phenyl-isocyanate,
2,6-di-sec.-butyl-phenyl-isocyanate,
2,6-diethoxy-phenyl-isocyanate,
2,6-dioctyl-phenyl-isocyanate,
2,6-octadecyl-phenyl-isocyanate,
2-isopropoxy-5-octyl-phenyl-isocyanate,
2-isopropyl-6-chloro-phenyl-isocyanate,
2-di-sec. butyl-6-nitro-phenyl-isocyanate and the like. 2,6-diisopropyl-phenyl-isocyanate, 2,6-diethyl-phenyl-isocyanate and 2,6-di-sec. butyl-phenyl-isocyanate are preferred.

The following are examples of aromatic polyisocyanates:

1,3-diisopropyl-2,6-phenylene diisocyanate,
1,4-diethyl-phenylene-2,5-diisocyanate,
1-methyl-3,5-diethyl-phenylene-2,4-diisocyanate,
1-methyl 3,5-diethyl-phenylene-2,6-diisocyanate,
1,3,5-triethyl phenylene-2,4,-diisocyanate,
1,3,5-triisopropyl phenylene-2,4-diisocyanate,
1,3,5-tri-sec. butyl phenylene-2,4-diisocyanate,
3,3'-diethyl-biphenyl-4,4'-diisocyanate,
3,5,3',5'-tetraethyl-diphenylmethane-4,4'-diisocyanate,
3,5,3',5'-tetraisopropyl-diphenylmethane-4,4'-diisocyanate,
3,5,3',5'-tetra tertiary butyl-diphenylmethane-4,4'-diisocyanate,
1-ethyl-4-ethoxy-phenylene-2,5-diisocyanate,
1-3-diethoxy-phenylene-4,6-diisocyanate,
1,4-diethoxy-phenylene-2,5-diisocyanate,
4,4'-diethoxydiphenylmethane-3,3'-diisocyanate,
4,4'-diethoxy-diphenyl-disulphide-3,3'-diisocyanate,
4,4'-diethoxy-diphenyl-sulphone-3,3'-diisocyanate,
4,4'-diethoxybenzene-sulphonyl-ethylene-diamine-3,3'-diisocyanate,
4,4'-diethoxybenzene-thioethylene glycol-3,3'-diisocyanate,
3,3'-diethoxy-4,4'-diisocyanatodibenzyl-thioether,
1,3,5-triethyl-benzene-2,4,6-triisocyanate,
1-ethyl-3,5-diisopropyl-benzene-2,4,6-triisocyanate,
1,3,5-triisopropyl-benzene-2,4,6-triisocyanate and the like. 1,3,5 - triisopropyl-phenyl-2,4-diisocyanate and 1,3,5 - triethyl-phenyl-2,4-diisocyanate are preferred.

(I) Carbodiimides having the formula

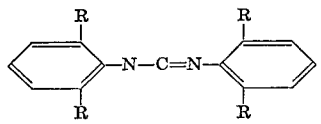

or
II

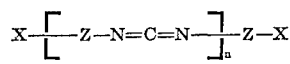

wherein Z is

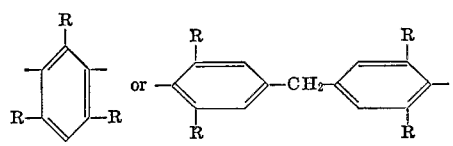

R is an alkyl radical or an alkoxy radical having 2 to 18 carbon atoms; X is —NCO or —N=C=N—R' where R' is the residue remaining after removal of an —NCO group from an organic monoisocyanate and $n$ is an integer of 2 to 40 are particularly useful stabilizers of polyesters against hydrolysis. Preferably R is an alkyl radical or an alkoxy radical having 2 to 4 carbon atoms.

When a monoisocyanate such as the doubly hindered ones set forth above are reacted, a carbodiimide in accordance with Formula I results; when a diisocyanate, such as the doubly hindered ones set forth above are reacted, a carbodiimide in accordance with Formula II results.

When a polyisocyanate reacts to form a polycarbodiimide the reaction may be terminated with a monofunctional isocyanate such as any of the monoisocyanates set forth above and also phenylisocyanate, tolylisocyanate, benzylisocyanate, ethylisocyanate, cyclohexylisocyanate and the like. Steric hindered aromatic isocyanates such as 2,6-diisopropyl-phenyl-isocyanate or 2,6-di-sec. butyl phenyl-isocyanate are preferred.

When polyisocyanates are initially used, polycarbodiimides with a high molecular weight structure are obtained. These polycarbodiimides will have a molecular weight in a range such that $n$ in the formula above is 2 to 40.

For modifying the properties of the final products, the diisocyanates and polyisocyanates can be so reacted beforehand with monoalcohols or polyalcohols, phenols, amines, polyethers, polythioethers, polyamides, polyesters containing —OH groups or polyacetals, the isocyanate component being used in stoichiometric excess. The compound containing free isocyanato groups obtained can then be used as a monomeric isocyanate for the process according to the invention. For example, when reacting glycols such as 1,3-butylene glycol, 2-ethyl-1,3-butylene glycol, 2-ethyl-1,3-butylene glycol, 2-ethyl-1,3-hexanediol, triols or higher polyhydric alcohols such as trimethylol propane, glycerine, castor oil or other polyfunctional alcohols such as pentaerythritol with an excess of the aforesaid polyisocyanates, there are formed polyisocyanates having sterically obstructed isocyanato groups, which yield linear or branched carbodiimides containing urethane groups in the process according to the invention. The formation of the isocyanuric acid rings and the carbodiimide group can take place simultaneously or in stages. All isocyanates can be reacted alone or mixed with one another.

Any suitable catalyst which will promote the trimerization of free —NCO groups that are not sterically hindered may be used. Examples of suitable catalysts are teriary amines, such as dimethyl benzyl amine, dimethyl stearyl amine, permethylated diethylene triamine, permethylated triethylene tetramine, N-methyl-N'-dimethylaminoethyl piperazine, N-alkyl-morpholines, such as N-methyl morpholine, N-ethyl morpholine and the like, N,N'-endoethylene piperazine, tertiary amino ethers, for example, the 1-alkoxy-3-dialkyl aminopropane, such as 1-ethoxy-3-methyl aminopropane, pyridine, substituted pyridines; such as b-methyl pyridine, also basic metal salts, such as sodium hydroxide, potassium hydroxide, sodium acetate, sodium alcoholate, such as sodium methoxide, sodium acetoacetic ester, sodium phenolate, metal salts of carboxylic acids, such as sodium sterate, lead naphthenate, lead laurate, zinc naphthenate, stannous octoate, stannous oleate and the like. Also to be mentioned are nonbasic organometallic compounds, such as molybdenum glycolate, dibutyl-tin-dilaurate, iron acetyl acetonate, titanium tetrabutylate, dibutyl-tin-di-2-ethyl-hexoate and the like. Mixtures of these catalyst can be in certain cases also employed. The metal compounds preferably have the formula:

$$M_n X_{(nz)}$$

wherein M is a metal atom having a valence of from 1 to 6, X is selected from the group consisting of hydroxyl, alkyl, —O-alkyl, O-aryl and

wherein R is selected from the group consisting of alkyl and aryl, $n$ is an integer of from 1 to 6 and $z$ is the valence of M. Preferably X is —O-alkyl and —O-aryl. A preferred catalyst is potassium carbonate.

Any suitable catalytic amount of the catalyst may be used but the isocyanate is preferably treated with about 0.01 percent to about 10 percent by weight of catalyst, related to the isocyanate being used. The reaction is carried out at an elevated temperature of at least about 120° C. and preferably from about 120° C. to about 300° C. The temperature conditions can be varied according to the quantity and activity of the catalyst. The reaction can, of course, be carried out in inert gases such as nitrogen or carbon dioxide, and in certain cases also in solvents, such as aromatic and aliphatic hydrocarbons and esters such as benzene, toluene, xylene, heptane, octane, acetoacetic ester and the like. It is not necessary that the catalyst is completely dissolved for the reaction to take place. The carbon dioxide gas split off in the reaction can be collected and measured and in addition to the titrimetric determination of the isocyanato group content, serves as an indication of the course of the reaction.

First of all the solvent and thereafter the di-(2,6-diisopropyl-phenyl) carbodiimide are distilled under partial vacuum at about 152 to about 162° C./0.05 mm. Hg. About 152 parts of pure carbodiimide are isolated, this representing a yield of about 95 percent. The liquid product crystallizes on standing and has a melting point of about 47° C. to about 49.5° C. In the infra-red spectrum, a strong band is found between 2130 to 2160 cm.$^{-1}$, which is characteristic of the accumulated double bond system of the —N=C=N— group.

*Analysis.*—$C_{25}H_{34}N_2$, molecular weight 362.54. Calculated (percent): 82.82 C; 9.45 H; 7.73 N. Found (percent): 82.15 C, 9.56 H; 8.16 N.

EXAMPLE 2

Separate samples of about 100 parts of 1,3,5-triisopropyl-benzene-2,4-diisocyanate are treated as described in Example 1 with varying quantities of the different catalysts shown in the following table at temperatures of from about 170° C. to about 220° C.

| Amount of catalyst in parts | Catalyst | Temp., °C. | Period of experiment in hours | Residual —NCO content, percent |
|---|---|---|---|---|
| 3 | Permethylated triethylene tetramine | 200 | 22 | 1.7 |
| 1 | 35% sodium methylate in methanol | 180–200 | 3 | 0.8 |
| 2.3 | Titanium tetrabutylate | 180–200 | 20 | 1.0 |
| 0.5 | 25% alcoholic potassium hydroxide | 190 | 4 | 0.85 |
| 3 | Dibutyl-tin-dilaurate | 200 | 40 | 2.0 |
| 5 | Lead naphthenate | 195 | 2½ | 0 |
| 6 | Stannous octoate | 178 | 3½ | 4.16 |
| 4 | Molybdenum glycolate | 200 | 10 | 0 |
| 5 | Iron acetyl acetonate | 200 | 19 | 0 |

The working up of the reaction mixture differs from case to case; according to the nature of the carbodiimide. Purification can be effected by distillation or recrystallization. The catalyst can be washed out or neutralized. The monocarbodiimides produced by the process are liquids or solid crystalline or resinous products. Depending on the choice of the starting components, the polycarbodiicides are soft to brittle resins.

The advantage of the process over the processes formerly employed for the production of carbodiimides is inter alia that carbodiimides can be prepared with the aid of simple catalysts which are readily available. The carbodiimides produced by the process are distinguished by a low vapor pressure and by high stability, which is often not obtained with simple unsubstituted carbodiimides.

The carbodiimides are very interesting because of the reactivity of the —N=C=N— group. They show a stabilizing action with respect to the influences of heat and moisture in polyester compositions modified by polymerizable monomers or polyisocyanates. Polycarbodiimides which in certain cases also contain isocyanate groups can, for example, be employed by the polyaddition process in combination with compounds containing reactive hydrogen in exactly the same way as simple polyisocyanates for sheet formations, filaments, elastomers and foam materials which are useful for moldings such as gears and the like, insulation for sound or thermal insulation as in buildings, refrigerators and the like. The invention is further illustrated by the following examples in which the parts are by weight unless otherwise indicated.

EXAMPLE 1

About 203 parts of 1-isocyanato-benzene 2,6-diisopropyl are heated with about 4 parts of sodium phenolate for about 4 hours to about 180° C. to about 200° C., strong evolution of carbon dioxide taking place. The free —NCO content of the reaction mixture continuously falls to zero during the experiment. The cooled reaction product is taken up in petroleum ether (boiling limits about 90° C. to about 120° C.) and filtered until clear.

In all experiments, light-colored to dark brown resins are formed, which are soluble in aromatic and aliphatic hydrocarbons, chlorobenzene, dioxane and the like. The softening point is about 190° C. to about 200° C. Infra-red adsorption spectra were made of all products; they all show a strong band between 2130 to 2160 cm.$^{-1}$, which is characteristic of the carbodiimide grouping. Analysis of the product prepared with sodium methylate is as follows:

Calculated $(C_{16}H_{22}N_2)_n$ (percent): 79.29 C; 9.15 H; 11.56 N. Found (percent): 79.36 C; 9.14 H; 11.59 N.

EXAMPLE 3

About 100 parts of 2,6-di-sec.-butyl-phenyl-isocyanate are treated as described in Example 1 with about 4 parts of approximately 25 percent alcoholic potassium hydroxide at about 200° C. and worked up. At about 170 to about 180° C./0.04 mm. Hg, about 79.5 parts of di-(2,6-di-sec.-butyl-phenyl)-carbodiimide distil over, this being a yield of about 94 percent. The product is a liquid which is slightly yellow in color and which shows the characteristic band between 2130 and 2160 cm.$^{-1}$ for the carbodiimide grouping in the infra-red spectrum.

*Analysis.*—$C_{28}H_{42}N_2$, molecular weight 406.63. Calculated (percent): 82.7 C; 10.41 H; 6.89 N. Found (percent): 82.76 C; 10.36 H; 6.33 N.

EXAMPLE 4

About 100 parts of 2,6-diethylphenyl isocyanate are treated as described in Example 1 with about 0.4 part of sodium phenolate. At about 135° C. to about 138° C./0.02 mm. Hg, about 51 parts by weight of a slightly yellowish colored liquid distil over. The infra-red spectrum shows the characteristic band for carbodiimides at 2130 to 2160 cm.$^{-1}$.

*Analysis.*—$C_{20}H_{26}N_2$, molecular weight 306.43. Calculated (percent): 82.31 C; 8.55 H; 9.14 N. Found (percent): 82.23 C; 8.45 H; 9.47 N.

EXAMPLE 5

About 100 parts of 2,4-diisopropylphenyl isocyanate are treated as in Example 1 with about 0.5 parts of sodium phenolate. Evolution of carbon dioxide occurs and after about 2 hours, the —NCO content has fallen to approximately zero. The brown resinous product shows the characteristic band of the carbodiimide group between 2130 and 2160 cm.$^{-1}$.

EXAMPLE 6

About 50 parts of 2,6-diethoxyphenyl isocyanate are treated as in Example 1 with about 0.5 part of sodium phenolate. Evolution of carbon dioxide occurs and the —NCO content falls within about 3 hours to approximately zero. On cooling, a brown resinous product is obtained, the infra-red spectrum of which shows the characteristic band between 2130 and 2160 cm.$^{-1}$ for the accumulated double bond system of the —N=C=N— group.

EXAMPLE 7

About 100 parts of 1,3,5-triisopropyl benzene-2,4,6-triisocyanate are treated as described in Example 1 with about 2 parts of approximately 25 percent alcoholic potassium hydroxide, about 6.1 litres of carbon dioxide being split off within about 90 minutes. On cooling, a brown resinous product is obtained with a residual —NCO content of about 13.6 percent. In the infra-red spectrum, there is found between 2130 and 2160 cm.$^{-1}$ the band is characteristic of the accumulated double bond system of the carbodiimide group.

EXAMPLE 8

About 100 parts of 1-methyl-3,5-diethylbenzene-2,6-diisocyanate are treated with about 1 part of approximately 35 percent sodium methylate solution, as described in Example 1. Distinct evolution of carbon dioxide is observed. With a residual —NCO content of about 5.6 percent the reaction is stopped by removing the heating source. The infra-red spectrum of the resin shows the band for the carbodiimide group between 2130 and 2160 cm.$^{-1}$, and this is a polycarbodiimide with terminal —NCO groups.

EXAMPLE 9

About 50 parts of cyclohexyl methyl isocyanate are heated as described in Example 1 with about 1 part of sodium phenolate to about 230° C. About 3 liters of carbon dioxide are split off within about 19 hours. The —NCO content of the liquid product is still about 0.84 percent. The product boils under partial vacuum at about 127° C. to about 135° C./0.09 mm. Hg and constitutes a colorless liquid. The infra-red adsorption spectrum shows a strong band between 2130 and 2160 cm.$^{-1}$, this being characteristic of the carbodiimide group.

*Analysis.*—$C_{17}H_{30}N_2$ molecular weight 262.43. Calculated (percent): 77.50 C; 11.52 H; 10.38 N. Found (percent): 77.42 C; 11.31 H; 10.85 N.

EXAMPLE 10

About 50 parts of 1,3,5-triethylbenzene-2,4-diisocyanate are stirred at about 200° C. for about 3 hours as described in Example 1 with about 2 parts of lead naphthenate. The liquid product with a residual —NCO content of about 15.4 percent, the infra-red adsorption spectrum of which shows the characteristic band for carbodiimides between 2130 and 2160 cm.$^{-1}$, constitutes a polycarbodiimide with terminal —NCO groups.

EXAMPLE 11

About 14.2 parts of octadecene-9,10-diol-1,12 are added dropwise within about 30 minutes and at about 120° C. to about 47.2 parts of 1,3,5-triisopropylbenzene-2,4-diisocyanate, and the mixture is stirred for approximately another 2 hours. The —NCO content of the product after this time is about 12.6 percent. About 0.5 part of approximately at 25 percent alcoholic potassium hydroxide is then added and the mixture heated to about 160° C. to about 180° C. Considerable quantities of $CO_2$ are involved; this temperature is maintained for about 2 hours, after which the —NCO content has fallen to about 0.3 percent. The infra-red spectrum of the polyurethane polycarbodiimide shows the characteristic band for the carbodiimide grouping at 2130 to 2160 cm.$^{-1}$.

EXAMPLE 12

About 57.2 parts of 1,3,5-triisopropylbenzene-2,4-diisocyanate are reacted as described in Example 11 with about 200 parts of a linear polyester consisting of adipic acid and diethylene glycol (—OH number about 56; acid number about 2). The isocyanato group content of the reaction product is about 4.2 percent. About 1 part of approximately a 25 percent alcoholic potassium hydroxide is then added and the mixture is stirred at about 200° C. for about 6 hours, carbon dioxide being involved. After cooling, the isocyanate group content is about 1.3 percent. The infra-red spectrum shows the characteristic band of the —N=C=N— group at 2130 to 2160 cm.$^{-1}$.

EXAMPLE 13

About 50 parts of 1,3,5-triisopropylbenzene-2,4-diisocyanate are approximately 50 percent dissolved in white spirit (boiling limits about 160 to about 196° C.) and boiled under reflux with addition of about 1 part of sodium phenolate. The isocyanato group content falls to about 1.0 percent within about 15½ hours with evolution of carbon dioxide. The infra-red spectrum of the solution shows the characteristic band of the —N=C=N— group at 2130 to 2160 cm.$^{-1}$. The reaction produces the same result when using ethylene glycol acetate, o-dichlorbenzene and a synthetic hydrocarbon (boiling limits 230–320° C.) as solvent.

EXAMPLE 14

About 50 parts of tertiary butylmethyl-methyl-isocyanate are boiled under reflux for about 50 hours with about two parts of approximately 25 percent alcoholic potassium hydroxide, as described in Example 1, at about 140° C. Carbon dioxide is evolved and the —NCO content falls continuously. On cooling, separation into a solid phase and a liquid phase occurs. Filtering takes place and the liquid is distilled at about 105 to about 112° C./15 mm. Hg. The distillate is N,N'-bis-3-(2,2-dimethylbutyl)-carbodiimide, which shows the characteristic band of the —N=C— group between 2130 and 2160 cm.$^{-1}$ in the infra-red spectrum.

EXAMPLE 15

About 100 parts of diethyl-methylisocyanate are stirred under reflux for about 24 hours with about 1 part of approximately a 25 percent alcoholic potassium hydroxide. With evolution of carbon dioxide, the —NCO content falls to about 1.2 percent. The liquid product is separated by filtration from the solid sediment and distilled. The fraction passing over at about 103° C. to about 133° C./15.5 mm. Hg contains N,N'-bis-(3-amyl)-carbodiimide, which shows the characteristic band of the —N=C=N— group at 2130 to 2160 cm.$^{-1}$ in the infra-red spectrum.

It is to be understood that any other suitable organic isocyanate, catalyst, solvent or the like could have been used in the foregoing examples with satisfactory results provided that the teachings of the disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:
1. A carbodiimide having the formula

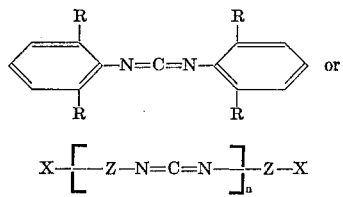

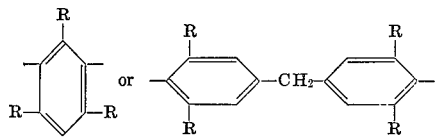

wherein Z is

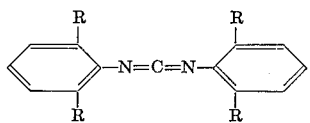

R is selected from the group consisting of an alkyl radical having 3 to 18 carbon atoms or an alkoxy radical having 2 to 18 carbon atoms, X is —NCO or —N=C=N—R' wherein R' is an alkyl, cycloalkyl or phenyl radical remaining after removal of an —NCO group from an organic monoisocyanate and $n$ is an integer of 2 to 40.

2. The carbodiimide of claim 1 having the formula:

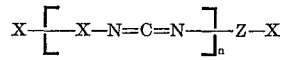

wherein R is selected from the group consisting of alkyl having 3 to 18 carbon atoms or alkoxy having 2 to 18 carbon atoms.

3. The carbodiimide of claim 1 having the formula:

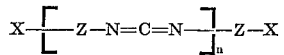

wherein Z is

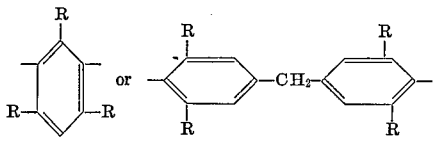

R is selected from the group consisting of an alkyl radical having 3 to 18 carbon atoms or an alkoxy radical having 2 to 18 carbon atoms, X is —NCO or

—N=C=N—R' wherein R' is an alkyl, cycloalkyl or phenyl radical remaining after removal of an —NCO group from an organic monoisocyanate and $n$ is an integer of 2 to 40.

4. The carbodiimide of claim 1 having the formula:

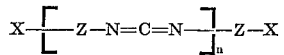

wherein Z is

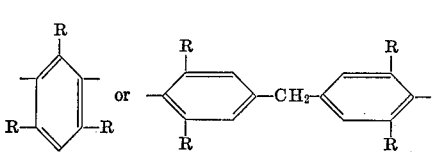

R is selected from the group consisting of an alkyl radical having 3 to 4 carbon atoms or an alkoxy radical having 2 to 4 carbon atoms, X is NCO or —N=C=N—R'— wherein R is alkyl, cycloalkyl or phenyl radical remaining after removal of an NCO group from an organic monoisocyanate and $n$ is an integer of 2 to 40.

5. The carbodiimide in accordance with claim 1 wherein R in each instance is isopropyl.

6. A process for preparing organic carbodiimides of the formula

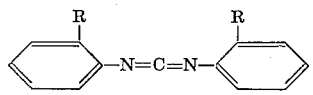

wherein R is selected from the group consisting of ethyl, propyl, ethoxy and propoxy which comprises heating in a range of from about 180 to 200° C. under anhydrous conditions an organic isocyanate of the formula

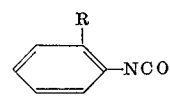

wherein R is defined as above in the presence of a catalytic amount of titanium tetrabutylate.

7. The carbodiimide in accordance with claim 2 wherein R in each instance is isopropyl.

8. The carbodiimide of claim 2 wherein R in each instance is secondary butyl.

9. The carbodiimide of claim 4 wherein Z in each instance is

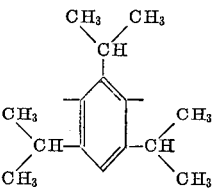

References Cited
UNITED STATES PATENTS

| | | | |
|---|---|---|---|
| 2,853,473 | 9/1958 | Campbell et al. | 260—551 XR |
| 2,853,518 | 9/1958 | Balon | 260—551 |
| 2,941,966 | 6/1960 | Campbell et al. | 260—551 XR |
| 2,941,983 | 6/1960 | Smeltz | 260—551 XR |
| 2,978,449 | 4/1961 | France et al. | 260—248 |
| 3,345,407 | 10/1967 | Tucker et al. | 260—551 |
| 3,426,025 | 2/1969 | Smeltz | 260—288 |

FOREIGN PATENTS 471,280  2/1951  Canada.

OTHER REFERENCES

Smolin et al., "S-Triazines and Derivatives," pp. 410 to 411, Interscience Publishers, Inc. (N.Y.) 1959, Chemical Abstracts vol. 52, cols. 18460 to 18461 (1958).

JOHN D. RANDOLPH, Primary Examiner

U.S. Cl. X.R.
260—77.5, 248, 453